UNITED STATES PATENT OFFICE.

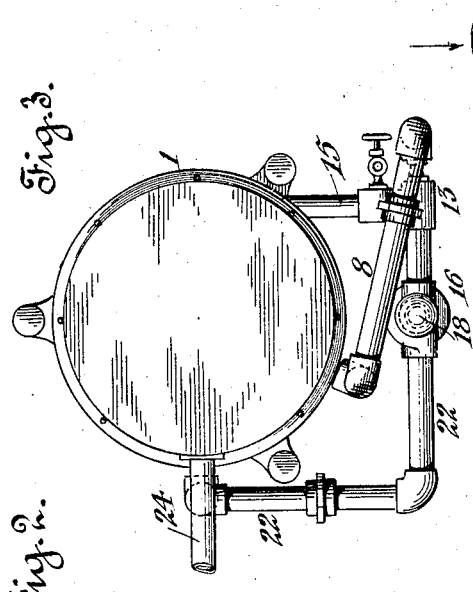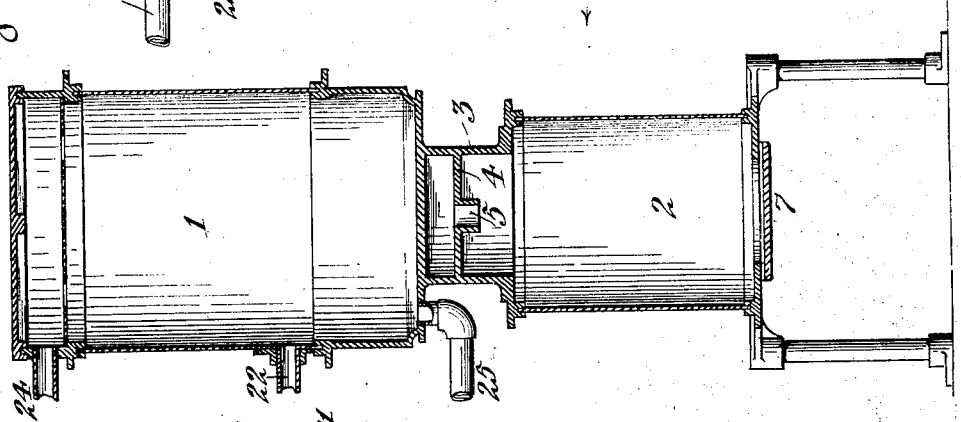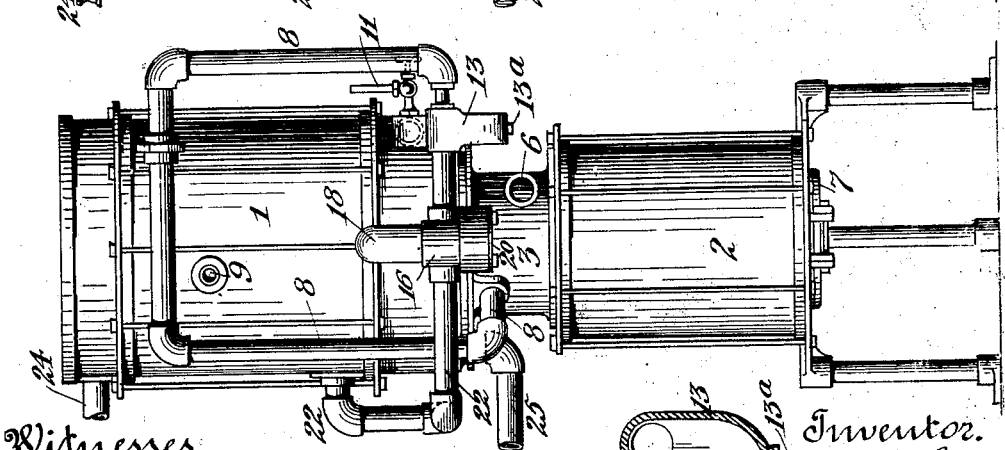

AUGUSTUS LOTZ, OF SAN FRANCISCO, CALIFORNIA, ASSIGNOR TO SANITARY DEVICES MANUFACTURING COMPANY, A CORPORATION OF CALIFORNIA.

APPARATUS FOR SEPARATING DUST FROM DUST-LADEN AIR-CURRENTS.

No. 845,562.     Specification of Letters Patent.     Patented Feb. 26, 1907.

Application filed November 14, 1904. Serial No. 232,659.

*To all whom it may concern:*

Be it known that I, AUGUSTUS LOTZ, a citizen of the United States, residing at San Francisco, in the county of San Francisco and State of California, have invented certain new and useful Improvements in Apparatus for Separating Dust from Dust-Laden Air-Currents, of which the following is a specification.

My invention relates to improvements in devices for the separation of dust or fine particles of solid matter from an air-current in which it is held in suspension, its object being to thoroughly separate or wash such solid matter from the air without the use of screens, filters, or other mechanical devices and without passing the air-current through a body of water.

To this end my invention consists generally in means for confining the air-current within narrow bounds and throttling it, so as to cause it to travel at high velocity, and for mingling with it while so confined and traveling at great velocity an atomized spray of water, also in means for so agitating and commingling the two fluids in their further travel by frictional contact of the fluids with confining and deflecting walls that practically all of the dust particles suspended in the air-current are brought into contact with and moistened by the spray, so as to be separated and precipitated from the air when released from confinement. Specifically, such means preferably comprises the following elements—viz., a narrow pipe or conduit through which the dust-laden air is propelled at high velocity by any suitable means, such as a vacuum-pump; a pocket or well in said conduit connected with a source of water-supply; an ejector-nozzle in said pipe arranged immediately above said well, adapted to throttle the air passing through the pipe to increase its velocity, so as to atomize the water in the well in contact therewith, and devices in the conduit beyond said ejector by contact with which the current is deflected and broken up and the fluids thoroughly intermingled. These deflecting devices comprise, preferably, a dome-shaped casing extending above and below the conduit, an inclined partition separating the upper and lower portions of the casing, and a vertical pipe extending through the partition and connecting the upper and lower chambers, the whole constituting a tortuous passage for the air-current.

In the accompanying drawings, forming part of this specification, is illustrated the preferred type of apparatus embodying my invention.

Figure 1 is an elevation of my improved apparatus. Fig. 2 is a central vertical section of Fig. 1. Fig. 3 is a top plan view of the same. Fig. 4 is a detail section of the atomizing and deflecting devices and connected parts. Fig. 5 is a plan view of the same, partly broken away; and Fig. 6 is a vertical cross-section of the water-pocket or well.

The drawings show three superposed cylinders 1, 2, and 3, the cylinder 2 being arranged at the bottom on suitable supports, the cylinder 1 at the top, and the cylinder 3 intermediate of the same. The cylinder 3 is divided by the horizontal partition 4 into two chambers connected by the centrally-arranged vertical pipe 5. The chamber 3 also has an inlet 6 arranged below the partition 4, while the pipe 8, connecting with the upper chamber, serves as an outlet. The cylinder 2 has a removable bottom 7, and the cylinder 1 a lateral port 9, through which water may be introduced, a water-gage 11, an air-inlet 22, an air-outlet 24, and a drainage-outlet 25. As shown in Fig. 1, the pipe 8, leading from the cylinder 3, passes upward laterally and thence downward, where the smaller pipe or nozzle 12 connects it with the casing 13, which extends in the form of a pocket or well below the level of the pipe 12 and is provided at its bottom with a removable plug 13ª. The vertical partition 4, arranged in the casing, extends considerably below the pipe 12. To the casing on the opposite side of the partition 14 is connected the water-pipe 15, which leads to the cylinder 1. Leading from the casing 13 is the pipe 10, which connects with the casing or chamber 16, provided with a removable bottom 20. This chamber is divided by an inclined partition 17, the upper part 18 of the chamber being preferably a glass dome. This upper part is connected with the bottom of the chamber by means of the vertical pipe 19, which extends above and below the partition 17. Connecting with the chamber on the opposite side and in line with the pipe 10 is the outlet-pipe 22, which connects the chamber or casing with the cylinder 1.

The operation of the apparatus is as follows: The chamber 1 is supplied with water to a depth a little less than the height of the air-inlet pipe 22. The water flows therefrom through the pipe 15 into the casing 13 and connected parts. Suction being applied to draw the air from the chamber 1 out through the pipe 24, the air to be cleaned is drawn from its source through the port 6 into the chamber 3. The spiral motion of the air-current serves to precipitate the heavier portions of the dust in the chamber 2, the partially-purified air flowing up through the pipe 5 and outward through the pipe 8. In the ordinary operation of the apparatus the air is drawn through the parts above described at high velocity, and as it passes through the narrow pipe or nozzle 12 it serves to atomize the water in the casing 13 at the outlet of the pipe 12. Thence the air-current and the entrained vapor are carried forward against the partition 17, thence upward into and around the dome 18 and downward through the pipe 19 to the bottom of the casing, thence upward and out through the pipe 22 into the chamber 1. The frictional contact of the air and vapor with the confining-walls above described serve to so thoroughly break up and commingle the fluids that practically every particle of dust is brought into contact with and thoroughly moistened by the vapor, so that when discharged through the pipe 22 into the chamber 1 the water and entrained dust drop into the bottom of the tank, while the purified air flows out through the pipe 24.

I claim—

1. Means for separating solid matter from the air in which it is suspended, comprising a narrow conduit, adapted to convey a stream of air at great velocity, a receptacle included therein connected with a source of water-supply, an ejector in the same operative by the passing air-current to atomize water in said receptacle, and deflecting devices interposed in the conduit beyond the atomizer.

2. Means for separating dust from a swiftly-moving air-current comprising in combination, a conduit for said current, a well or pocket in said conduit in communication with a source of water-supply, an ejector adjacent said well, a deflecting-plate in said conduit beyond said ejector, and a chamber above said plate.

3. In combination, a narrow conduit adapted to convey a current of dust-laden air at great velocity, a communicating water-inlet, an ejector in the conduit at the junction of the water-inlet operative by the air-current to atomize and entrain the inflowing water, a deflecting-plate in said conduit and chambers above and beneath said plate.

In testimony whereof I have affixed my signature, in presence of two witnesses, this 19th day of July, 1904.

AUGUSTUS LOTZ.

Witnesses:
L. W. SEELY,
M. R. SEELY.